United States Patent
Kochen

(10) Patent No.: US 12,410,063 B1
(45) Date of Patent: Sep. 9, 2025

(54) COPPER OXIDE SYNTHESIS BY A BORATE METHOD

(71) Applicant: Robert L. Kochen, Boulder, CO (US)

(72) Inventor: Robert L. Kochen, Boulder, CO (US)

(73) Assignee: Robert L. Kochen, Boulder, CO (US)

( * ) Notice: Subject to any disclaimer, the term of this patent is extended or adjusted under 35 U.S.C. 154(b) by 0 days.

(21) Appl. No.: 19/173,971

(22) Filed: Apr. 9, 2025

Related U.S. Application Data

(63) Continuation-in-part of application No. 18/944,203, filed on Nov. 12, 2024, now Pat. No. 12,281,026, which is a continuation-in-part of application No. 18/772,446, filed on Jul. 15, 2024, now abandoned.

(51) Int. Cl.
*C01G 3/02* (2006.01)
*C01B 35/12* (2006.01)

(52) U.S. Cl.
CPC .............. *C01G 3/02* (2013.01); *C01B 35/127* (2013.01); *C01P 2004/61* (2013.01)

(58) Field of Classification Search
None
See application file for complete search history.

(56) References Cited

U.S. PATENT DOCUMENTS

| | | | |
|---|---|---|---|
| 4,066,564 A | 1/1978 | Sasazawa et al. | |
| 5,258,365 A | 11/1993 | Sheng | |
| 2003/0185748 A1 | 10/2003 | Sinha et al. | |
| 2007/0003475 A1 | 1/2007 | Lim | |
| 2012/0298908 A1 | 11/2012 | Ueyama et al. | |
| 2022/0371912 A1 | 11/2022 | Martos et al. | |

FOREIGN PATENT DOCUMENTS

| | | | | |
|---|---|---|---|---|
| CN | 106241883 A | | 1/2018 | |
| CN | 109095494 A | * | 12/2018 | ............. B82Y 40/00 |
| CN | 109702219 A | * | 5/2019 | |
| CN | 106861695 B | | 8/2019 | |
| CN | 112194187 A | | 3/2022 | |
| CN | 115159586 A | | 10/2022 | |
| CN | 117070980 A | * | 11/2023 | |

OTHER PUBLICATIONS

English translation of CN-117070980-A Description. (Year: 2023).*
English translation of CN-109095494-A Description. (Year: 2018).*
English translation of CN-109702219-A Description. (Year: 2019).*
Bancroft, W. D. and Nugent, R. L. Copper oxide in the borax bead. J. Phys. Chem. 1929, 33, 5, 729-744. (Year: 1929).*

(Continued)

*Primary Examiner* — Anthony J Zimmer
*Assistant Examiner* — Zachary John Baum
(74) *Attorney, Agent, or Firm* — Patricia C. Brzostowicz; Superior Patent Group, LLC

(57) ABSTRACT

A copper oxide synthesis via the use of cuprous and borate ions is disclosed. A cuprous compound reacts with sodium borate to form a cuprous borate precipitate. Oxidizing a cuprous borate with an oxygen enhanced flame synthesizes copper oxide. The cuprous borate may be reduced to nanoparticle size via pulverization to produce copper oxide nanoparticles.

20 Claims, 2 Drawing Sheets

$$2CuCl + Na_2B_4O_7 \longrightarrow Cu_2B_4O_7(s) + 2NaCl$$

Cuprous Chloride + Sodium Borate ⟶ Cuprous Borate + Sodium Chloride

(56) References Cited

OTHER PUBLICATIONS

Antonijevic, M. M., et al. The influence of pH on electrochemical behavior of copper in presence of chloride ions. In. J. Electrochem. Sci., 4 (2009) 516-524. (Year: 2009).*

Zhou, Y., et al. Temperature effects on the passivity breakdown of copper in chloride-containing borate buffer solution. Materials and Corrosion. 2024;75;505-515 (First published Nov. 14, 2023) (Year: 2023).*

Synthesis and Characterization of Copper Ferrite Nanoparticles, IOP Conference Series: Materials, Faten Haithum Mulud et al.2020 IOP Conf. Ser.: Mater. Sci. Eng. 928 072125.

Dippong, T.; Levei, E.A.; Cadar, O. Recent Advances in Synthesis and Applications of MFe2O4 (M=Co, Cu, Mn, Ni, Zn) Nanoparticles. Nanomaterials 2021, 11.

Eriksoon: Thermodynamic studies of high temperature equilibria IX. Experimental determination of the stable solid (CU, Fe, S, O)-phases in equilibrium with gas mixtures SO2, O2, N2 at temperatures 1000-1300 K, 1974—in U.S. Appl. No. 18/944,203, filed Nov. 12, 2024 of common inventorship and by the same applicant.

Zhang: One-pot synthesis of magnetic copper ferrite nanocubes for hydrogen production by hydrolysis of sodium borohydride, 2023, in U.S. Appl. No. 18/944,203, filed Nov. 12, 2024 of common inventorship and by the same applicant.

Comey: A dictionary of chemical solubilities, inorganic, 1921 in U.S. Appl. No. 18/944,203, filed Nov. 12, 2024 of common inventorship and by the same applicant.

* cited by examiner $2CuCl + Na_2B_4O_7 \longrightarrow Cu_2B_4O_7 (s) + 2NaCl$

Cuprous Chloride + Sodium Borate ⟶ Cuprous Borate + Sodium Chloride

Heat
2Cu$_2$B$_4$O$_7$ (s) + O$_2$ —-> 4CuO (s) + 4B$_2$O$_3$

Cuprous Borate + Oxygen —-> Cupric Oxide + Boric Oxide

FIG. 2

COPPER OXIDE SYNTHESIS BY A BORATE METHOD

The following application is an application for patent under 35 USC 111 (a). The present application claims priority to U.S. patent application Ser. No. 18/772,446 filed Jul. 15, 2024 and U.S. patent application Ser. No. 18/944,203 filed Nov. 12, 2024 of common inventorship and by the same applicant.

FIELD OF THE DISCLOSURE

This disclosure relates to the field of chemical synthesis of copper oxide.

BACKGROUND

Copper oxide, referring to either copper (I) oxide ($Cu_2O$), cuprous oxide, or copper (II) oxide (CuO), cupric oxide, is a semiconducting compound and has many unique applications including diodes, rectifiers, and antibacterial uses. Recent copper oxide (CuO) applications include antibacterial and anticancer nanoparticles (CuNPs), biosensors, photocatalysts, water purification and as a catalyst in various chemical reactions. Other applications include pigments to create colors in ceramics and glazes. There is still a need in the field for a simple, robust, and cost effective method for synthesis of copper oxide nanoparticles.

SUMMARY OF THE DISCLOSURE

The present disclosure is drawn to a method for producing copper oxide via a borate method. This borate method comprises the steps of: forming a cuprous ion solution, forming a borate ion solution, mixing the cuprous ion solution and the borate ion solution, and precipitating cuprous borate. The method may further comprise separating cuprous borate by filtration. The method may further comprise drying the cuprous borate. The method may further comprise pulverizing or physically manipulating the cuprous borate. The method may further comprise sieving or separating the cuprous borate based on particle size. The method may further comprise oxidizing cuprous borate to produce cupric oxide or copper oxide. This oxidation may comprise using an oxygen enhanced flame. In other embodiments, the method comprises combining cuprous ion compounds, such as cuprous chloride, and a borate ion compound, such as sodium borate to form cuprous borate, followed by oxygenating cuprous borate to form cupric oxide.

BRIEF DESCRIPTION OF THE DRAWINGS

FIG. 2 is a chemical equation depicting obtaining cupric oxide and boric oxide from cuprous borate and oxygen.

Figure 1:
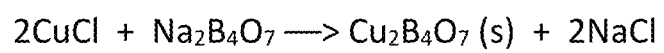
FIG. 1 is a chemical equation depicting obtaining cuprous borate from cuprous chloride and sodium borate.

Before explaining the disclosed embodiments of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DISCLOSURE

Terms

As used herein, a "cuprous ion", Cu(I) refers to elemental copper in its +1 oxidation state, denoted as $Cu^{1+}$. A cuprous ion may combine with other elements or compounds to form a "cuprous ion compound". Examples of cuprous ion compounds include but are not limited to copper, or cuprous oxide ($Cu_2O$), cuprous borate ($Cu_2B_4O_7$), cuprous chloride (CuCl), cuprous fluoride (CuF), cuprous iodide (CuI), cuprous sulfide ($Cu_2S$), cuprous thiocyanate (CuSCN) and cuprous selenide ($Cu_2Se$).

As used herein, a "cupric ion", CU(II) refers to elemental copper in its +2 oxidation state, denoted as $Cu^{2+}$. A cupric ion may combine with other elements or compounds to form a "cupric ion compound". Examples of cupric ion compounds include but are not limited to copper, or cupric sulfate ($CuSO_4$), cupric ferric oxide or copper ferrite being $CuO \cdot Fe_2O_3$ or $CuOFe_2O_3$, cupric oxide (CuO), cupric borate ($CuB_4O_7$), cupric boride ($Cu_3B_2$), cupric nitrate $Cu(NO_3)_2$, cupric fluoride ($CuF_2$), cupric bromide ($CuBr_2$), cupric chloride ($CuCl_2$), cupric metaborate ($Cu(BO_2)_2$ and cupric cyanide $Cu(CN)_2$.

As used herein, a "borate ion" refers to borate in its −3 oxidation state, denoted as $BO_3^{3-}$. A borate ion may combine with other elements or compounds to form a "borate ion compound." Examples of borate ion compounds include but are not limited to sodium borate, $Na_2B_4O_7$, potassium borate, $K_2B_4O_7$, boric acid, $H_2B_4O_7$, cuprous borate ($Cu_2B_4O_7$), and ferric borate ($Fe_2(B_4O_7)_3$.

As used herein, "sodium borate" is represented by the chemical formula $Na_2B_4O_7$.

As used herein, "sodium chloride" is represented by the chemical formula NaCl.

As used herein, "boric oxide" is represented by the chemical formula $B_2O_3$.

As used herein "Cu" indicates copper, "Na" indicates sodium, "B" indicates boron, "O" indicates oxygen, "Cl" indicates chloride, "$B_4O_7$" indicates borate, and "$B_2O_3$" indicates boric oxide.

As used herein, "s" or "(s)" denotes a solid, "l" or "(l)" denotes a liquid, "g" or "(g)" denotes a gas, and "aq" or "(aq)" denotes an aqueous, or water-based, solution.

As used herein, "a precipitate" is a solid formed by a precipitation reaction, the solid being insoluble in a solution, or supernatant, of the reaction.

As used herein, a "precipitation reaction" is a reaction that transforms a dissolved substance, being an element or compound, for example, into an insoluble solid from a supernatant solution.

As used herein, a "supernatant" is an aqueous solution, or soluble liquid fraction, in which one or more elements or compounds may be dissolved, after precipitation of insoluble solids.

As used herein, a "stoichiometric amount" or "stoichiometric ratio" of a reagent is the optimum amount or ration where, assuming that the reaction proceeds to completion, all of the reagent is consumed and therefore there is no deficiency or excess of the reagent.

As used herein, a "reagent" or "reactant" is an element, substance, or compound added to a system or reaction to cause a chemical reaction.

As used herein, "pulverization" or "pulverizing" indicates physically grinding, pressing, or otherwise manipulating.

As used herein, "sieving" indicates physical separation based on size via either exclusion or inclusion of the target. Filtration or other means of sieving may be employed.

As used herein, "oxidation" or "oxidation reaction" denotes a reaction which comprises a loss of electrons or increase in oxidation state of a molecule, atom, or ion in a chemical reaction. Oxidation may result in adding an oxygen to a molecule, atom, or compound therefore resulting in an electron loss and increase in oxidation state. For example, cuprous borate may undergo an oxygenation reaction with oxygen to form copper oxide. This oxygenation reaction may be accomplished via heating. This oxygenation reaction may be accomplished via heating with an oxygenated heat source. This oxygenation reaction may be accomplished via heating with an oxygen-enriched flame.

As used herein, "reduction" or "reduction reaction" denotes a reaction which comprises a gain of electrons or decrease in oxidation state of a molecule, atom, or ion in a chemical reaction. Reduction may also be defined as the gain of hydrogen.

Common metric units are used throughout including but not limited to µg or ug, being microgram, mg, being milligram, g, being gram or grams, kg, being kilogram, µl or ul, being microliter, ml, being milliliter, l, being liter.

DESCRIPTION OF THE DISCLOSURE

The present disclosure is a copper oxide formed via the method described herein and a method for synthesis of copper oxide. As represented in FIG. 1, the method comprises a first step, step 1, of combining cuprous and borate ions to form a cuprous borate precipitate. Stoichiometric amounts of aqueous cuprous chloride, CuCl, is combined with stoichiometric amounts of aqueous sodium borate, also known as borax, or $Na_2B_4O_7$, $Na_2B_4O_7 \cdot 10H_2O$, in solution, to form a cuprous ion, in the form of cuprous borate, $Cu_2B_4O_7$ (s), as a solid precipitate and sodium chloride, NaCl, in the aqueous supernatant. Other cuprous ions may be formed and employed including but not limited to cuprous fluoride (CuF), cuprous iodide (CuI), cuprous sulfite ($Cu_2SO_3$), and cuprous selenide ($Cu_2Se$).

Following step 1, the solid cuprous borate, $Cu_2B_4O_7$, is filtered and air dried. In an optional step the $Cu_2B_4O_7$ (s) may be pulverized to smaller particles, being nanoparticles. The particles may be separated by size. The $Cu_2B_4O_7$ (s) is oxidized to copper oxide CuO as represented in FIG. 2.

In another embodiment, a cuprous ion and borate ion may be combined and heated in water to form cuprous borate which precipitates as a solid. Examples of cuprous ions or ion compounds include but are not limited to copper, or cuprous oxide ($Cu_2O$), cuprous borate ($Cu_2B_4O_7$), cuprous chloride (CuCl), cuprous fluoride (CuF), cuprous iodide (CuI), cuprous sulfide ($Cu_2S$), cuprous thiocyanate (CuSCN) and cuprous selenide ($Cu_2Se$).

Examples of borate ion compounds include but are not limited to sodium borate, $Na_2B_4O_7$, potassium borate, $K_2B_4O_7$, boric acid, $H_2B_4O_7$, cuprous borate ($Cu_2B_4O_7$), and ferric borate ($Fe_2(B_4O_7)_3$).

Following formation of cuprous borate ($Cu_2B_4O_7$) precipitate in FIG. 1, cuprous borate is filtered and air dried. In an optional step the $Cu_2B_4O_7$ (s) may be pulverized to smaller particles, being nanoparticles. The particles may be separated by size. The $Cu_2B_4O_7$ (s) is oxidized to copper oxide CuO as represented in FIG. 2.

EXAMPLES

TABLE 1

Solutions Used in the Following Examples

| Solution | Ingredients |
|---|---|
| A | 0.70 g cuprous chloride dissolved in 100 ml water |
| B | 1.35 g sodium borate dissolved in 50 ml water |

Example 1

As an example, synthesis of at least one gram of copper oxide was attempted. All compounds used were reagent grade and distilled water was employed. For the reaction, 0.70 grams (g) cuprous chloride (CuCl) was dissolved in 100 ml hot distilled water, wherein the water was heated to 60° C. to form a cuprous chloride solution, solution A as indicated in Table 1. An amount of 1.35 g sodium borate ($Na_2B_4O_7 \cdot 10H_2O$) being a stoichiometric amount, was dissolved in 50 ml hot distilled water, wherein the water was heated to 60° C. to form a sodium borate solution, solution B as indicated in Table 1.

The temperature of the water for all solutions created in all examples of the disclosure was chosen based on solubility. A range of water temperatures may be used, however decrease in water temperature may result in reduced solubility. For example, three grams of sodium borate will dissolve in 100 ml of water at a temperature of 25° C., whereas 30 grams dissolves in 100 ml of water at a temperature of 60° C. Also, cuprous chloride is sparingly soluble in water. Sparingly soluble is defined as one gram of material dissolves in 30 to 100 ml of solvent.

The dissolved cuprous chloride solution, solution A, and the sodium borate solution, solution B, were combined. Upon combining the solutions, a green precipitate of cuprous borate ($Cu_2B_4O_7$) forms with sodium chloride (NaCl) in the supernatant. FIG. 1 illustrates the forming of cuprous borate and sodium chloride. The precipitate was next filtered from the supernatant with Whatman No. 1 paper with a pore size of 11 micron, dried in a convection oven at 75° C., pulverized with mortar and pestle, and sieved to a particle size of less than 74 microns, being between about 11 microns and 74 microns. Subsequently, 0.5 g cuprous borate was placed into a porcelain cup and heated directly with an oxygen enhanced flame, examples being propane and oxygen gas. Within seconds, the green cuprous borate transformed into black cupric oxide. The resulting cupric oxide measured between 11 and 74 microns in size. Two moles of cuprous borate combine with one mole of oxygen and transform into four moles of copper oxide and four moles of boric oxide as illustrated in FIG. 2.

Example 2

In another example, synthesis of at least one gram of copper oxide was attempted. All compounds used were reagent grade and distilled water was employed. For the reaction, 0.70 grams (g) cuprous chloride was combined with 1.35 g of sodium borate, being a stoichiometric amount. These were dissolved in 150 ml hot distilled water, wherein the water was heated to 60° C., to form a precipitate of cuprous borate ($Cu_2B_4O_7$), with a supernatant of sodium chloride (NaCl). FIG. 1 illustrates the forming of cuprous borate and sodium chloride. The precipitate was next filtered from the supernatant with Whatman No. 1 paper with a pore size of 11 micron, dried in a convection oven at 75° C., pulverized with mortar and pestle, and sieved to a particle size of less than 74 microns. Subsequently, 0.5 g cuprous borate was placed into a porcelain cup and heated directly with an oxygen enhanced flame, being a propane and oxygen gas. Within seconds, the cuprous borate transformed into black cupric oxide. Two moles of cuprous borate combine with one mole of oxygen and transform into four moles of copper oxide and four moles of boric oxide as illustrated in FIG. 2.

Although the present invention has been described with reference to the disclosed embodiments, numerous modifications and variations can be made and still the result will come within the scope of the invention. No limitation with respect to the specific embodiments disclosed herein is intended or should be inferred. Each apparatus embodiment described herein has numerous equivalents.

What is claimed is:

1. A method for producing copper oxide, the method comprising the steps of:
    a) combining cuprous chloride and sodium borate to form cuprous borate;
    b) oxygenating cuprous borate to form cupric oxide.

2. The method of claim 1 further comprising reducing the size of the cupric oxide.

3. The method of claim 2, wherein the size of the cupric oxide is less than 74 microns.

4. A method for producing copper oxide, the method comprising the steps of:
    a) combining cuprous chloride and sodium borate to form cuprous borate:
    b) oxygenating cuprous borate to form cupric oxide; and
    c) wherein the cuprous borate forms a cuprous borate precipitate.

5. The method of claim 4 further comprising filtering the cuprous borate precipitate.

6. The method of claim 5 further comprising drying the cuprous borate precipitate.

7. The method of claim 6 further comprising reducing the size of the cuprous borate precipitate.

8. The method of claim 7, wherein the size of the cuprous borate is reduced to less than 74 microns.

9. The method of claim 7, wherein the cuprous borate is reduced in size via physical means.

10. The method of claim 7, wherein the cuprous borate is pulverized.

11. The method of claim 4, wherein the oxygenating of cuprous borate comprises heating with an oxygen enriched flame.

12. A method for producing copper oxide, the method comprising the steps of:
    a) forming a cuprous ion solution;
    b) forming a borate ion solution;
    c) mixing the cuprous ion solution and the borate ion solution to precipitate cuprous borate; and
    d) transforming the cuprous borate to cupric oxide.

13. The method of claim 12, wherein the cuprous borate is transformed to cupric oxide via oxygenation.

14. The method of claim 13, wherein the oxygenation is accomplished via oxygen enriched heating.

15. The method of claim 12 further comprising separating the cuprous borate.

16. The method of claim 12 further comprising separating the cuprous borate based on size.

17. The method of claim 12 further comprising drying the cuprous borate.

18. The method of claim 12 further comprising physically reducing the size of the cuprous borate.

19. The method of claim 18, wherein the cuprous borate is reduced via pulverization.

20. The method of claim 18, wherein the cuprous borate is reduced to less than 74 microns.

* * * * *